(12) United States Patent
Pilcher et al.

(10) Patent No.: US 8,272,862 B2
(45) Date of Patent: Sep. 25, 2012

(54) ARTICLE AND METHOD FOR FABRICATING AN APPLICATOR TIP ASSEMBLY FOR A SKIN FORMULATION APPLICATOR

(75) Inventors: Kenneth A Pilcher, Seattle, WA (US); Richard A Reishus, Renton, WA (US); Gregory W Herlin, Kirkland, WA (US)

(73) Assignee: L'Oreal SA (FR)

( * ) Notice: Subject to any disclaimer, the term of this patent is extended or adjusted under 35 U.S.C. 154(b) by 0 days.

(21) Appl. No.: 12/474,518

(22) Filed: May 29, 2009

(65) Prior Publication Data

US 2010/0301520 A1    Dec. 2, 2010

(51) Int. Cl.
*B05C 19/06* (2006.01)

(52) U.S. Cl. ............... 425/87; 425/458; 249/58; 249/82; 249/120; 249/124; 249/144; 222/173; 222/564

(58) Field of Classification Search ............ 249/52, 249/58, 82, 88, 90, 95–97, 120, 122, 124, 249/134, 136, 139, 144, 163, 197, 202, 203; 224/196, 201, 231, 242, 601, 602, 613, 663; 248/309.1, 311.2, 312.1, 313, 346.03, 346.2, 248/346.3, 346.5; 220/755, 759, 771, 772; 300/1, 16, 21; 222/173, 175, 180, 182, 184, 222/564; 425/87, 458
See application file for complete search history.

(56) References Cited

U.S. PATENT DOCUMENTS

| | | | | |
|---|---|---|---|---|
| 875,944 A | * | 1/1908 | Nash | 220/571 |
| 1,258,209 A | * | 3/1918 | Gathmann | 249/106 |
| 1,833,858 A | * | 11/1931 | Roberts | 15/257.07 |
| 2,166,587 A | * | 7/1939 | Gathmann | 428/585 |
| 2,716,250 A | * | 8/1955 | Deakers | 401/186 |
| 3,429,096 A | * | 2/1969 | Griese, Jr | 53/471 |
| 4,124,141 A | * | 11/1978 | Armentrout et al. | 220/783 |
| 4,154,423 A | * | 5/1979 | Crock | 249/134 |
| 4,496,070 A | * | 1/1985 | Lane, Jr. | 249/117 |
| 4,520,943 A | * | 6/1985 | Nielsen | 220/281 |
| 4,940,158 A | * | 7/1990 | Farrell et al. | 220/258.2 |
| 5,180,506 A | * | 1/1993 | Mulhorn | 249/197 |
| 5,307,951 A | * | 5/1994 | Kuhn | 220/771 |
| 5,397,195 A | * | 3/1995 | Goncalves | 401/277 |
| 5,507,406 A | * | 4/1996 | Urciuoli et al. | 220/269 |
| 5,615,963 A | * | 4/1997 | Kobayashi | 401/206 |

(Continued)

FOREIGN PATENT DOCUMENTS

EP    379752 A1 *  8/1990

*Primary Examiner* — Dimple Bodawala
(74) *Attorney, Agent, or Firm* — Jensen & Puntigam, P.S.

(57) ABSTRACT

The article and corresponding method include a casting fixture for a part of a skin formulation applicator which is otherwise difficult to cast. The casting fixture includes a central cup section and two opposing tear-away sections. A rigid base portion of an applicator tip assembly is mounted into an upper rim of the cup section and liquid silicone material is poured into the volume defined in the cup section portion beneath the base portion. The silicone cures and bonds to extending elements from the base portion, providing a firm connection between the cast tip portion and the base portion. When the combined part is ready for use, the tear-away sections are removed by the user, which results in an easy ejection of the part, which can then be installed by the user in the formulation applicator.

7 Claims, 2 Drawing Sheets

U.S. PATENT DOCUMENTS

| | | | |
|---|---|---|---|
| 6,688,795 B1* | 2/2004 | Jacob et al. | 401/207 |
| 7,273,086 B2* | 9/2007 | Richter et al. | 164/472 |
| 7,335,188 B2* | 2/2008 | Graf | 604/317 |
| 7,461,988 B2* | 12/2008 | Albisetti | 401/116 |
| 2002/0131806 A1* | 9/2002 | Katz et al. | 401/6 |
| 2004/0089676 A1* | 5/2004 | Greer et al. | 222/538 |
| 2004/0094587 A1* | 5/2004 | Harden et al. | 224/275 |
| 2005/0265774 A1* | 12/2005 | Albisetti | 401/277 |
| 2006/0056905 A1* | 3/2006 | Thiebaut | 401/207 |
| 2006/0257199 A1* | 11/2006 | Sogaro | 401/132 |
| 2007/0045329 A1* | 3/2007 | Yeh | 220/772 |

* cited by examiner

ARTICLE AND METHOD FOR FABRICATING AN APPLICATOR TIP ASSEMBLY FOR A SKIN FORMULATION APPLICATOR

TECHNICAL FIELD

This invention relates generally to appliances for applying skin treatment formulations to the facial area of the human body, and more particularly concerns an article and method for fabricating an applicator tip assembly used in such an appliance.

BACKGROUND OF THE INVENTION

Many parts used in small personal appliances, such as skin formulation applicators, are made by casting methods using a mold/fixture. It is important to control the cost of the cast parts to ensure product success in the marketplace. The cost of the mold and the details of the casting process are both important in controlling costs. The casting process can be slow and requires a large quantity of mold cavities, which are generally expensive, in order to meet high volume manufacturing requirements. In addition, problems may be encountered in removing cast parts from the fixtures, especially low durometer silicone parts. Further, the silicone parts can often be tacky after they have been removed from the cavity, requiring special handling techniques to ensure that the parts remain clean when they are provided to the user for replacement of existing parts. Still further, parts comprising low durometer silicone are difficult to attach directly to other elements, such as a drive end of a motor, after they have been cured and otherwise ready for use.

Hence, there is a need for both a casting fixture and a method of casting particular parts which are used in skin formulation applicators, to reliably produce clean parts inexpensively and to firmly affix the parts to a companion part during the casting process to produce a desired combination/assembly for the applicator.

SUMMARY OF THE INVENTION

Accordingly, the invention in one aspect is an article for casting parts, comprising: a single-use casting fixture which includes a casting section and a tear-away section, the casting section including a rim portion adapted to receive a base portion of an applicator tip assembly part, the casting section having an interior volume beneath the rim portion to receive flowable casting material suitable for contact with facial skin area of a user for application of skin formulations, wherein the silicone material fills the interior volume and when cured to solid form bonds to extending elements from the base portion, forming a firm engagement therewith, wherein the resulting combination of the casting fixture and the applicator tip assembly part can be stored until ready for use, and wherein the tear-away section permits convenient removal of the part from the casting fixture.

In another aspect the invention is a method for casting a tip portion of a tip applicator assembly used in a skin formulation applicator, wherein the tip portion is mated with a base portion of the tip applicator during casting, the method comprising the steps of: positioning the base portion of a tip applicator assembly in a casting fixture, the casting fixture including a cup section for receiving the base portion and at least one tear-away section, the casting fixture comprising a material which is readily separable from and will not adhere to the casting material comprising the tip portion of the part following casting thereof; pouring the casting material into a volume in the cup section beneath the positioned base portion, the casting material engaging and bonding to an extending part of the base portion; and allowing the casting material to cure, such that the base portion and the tip portion form a cohesive whole, wherein the casting fixture with the cast part therein can be stored until the tip applicator assembly is ready for use.

BEST MODE FOR CARRYING OUT THE INVENTION

Figure 1:
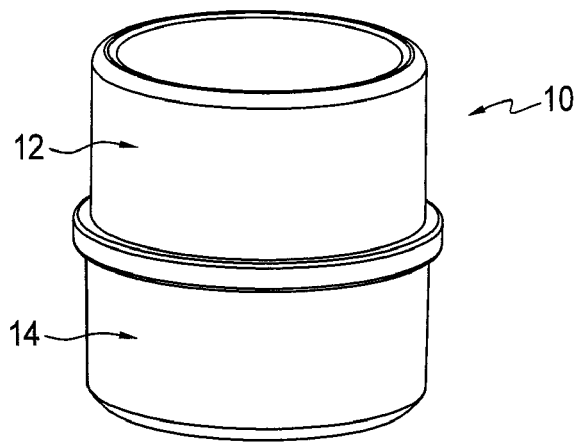
FIG. 1 is an isometric view of an applicator tip assembly which is produced by use of the fabrication method disclosed herein.
Figure 2:
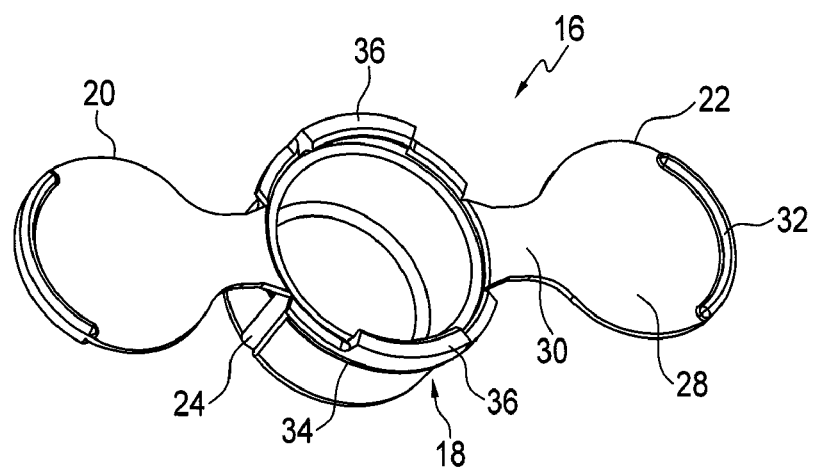
FIG. 2 is a perspective view of the casting fixture disclosed herein.
Figure 3:
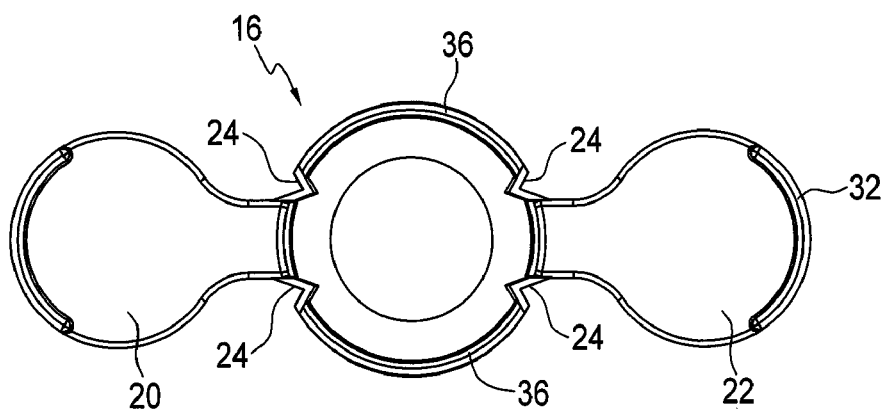
FIG. 3 is a top view of the casting fixture of FIG. 2.
Figure 4:
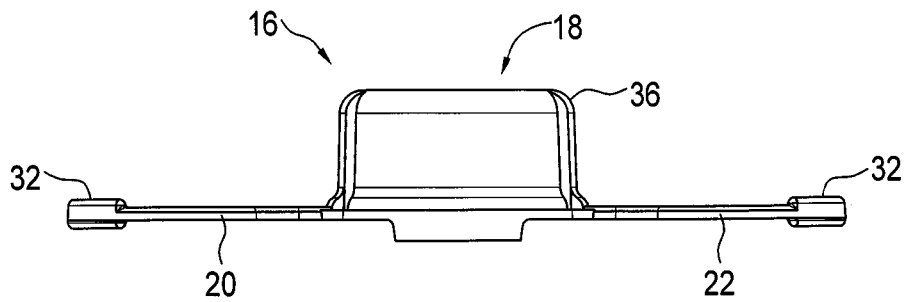
FIG. 4 is a side elevational view of the casting fixture of FIGS. 2 and 3.
Figure 5:
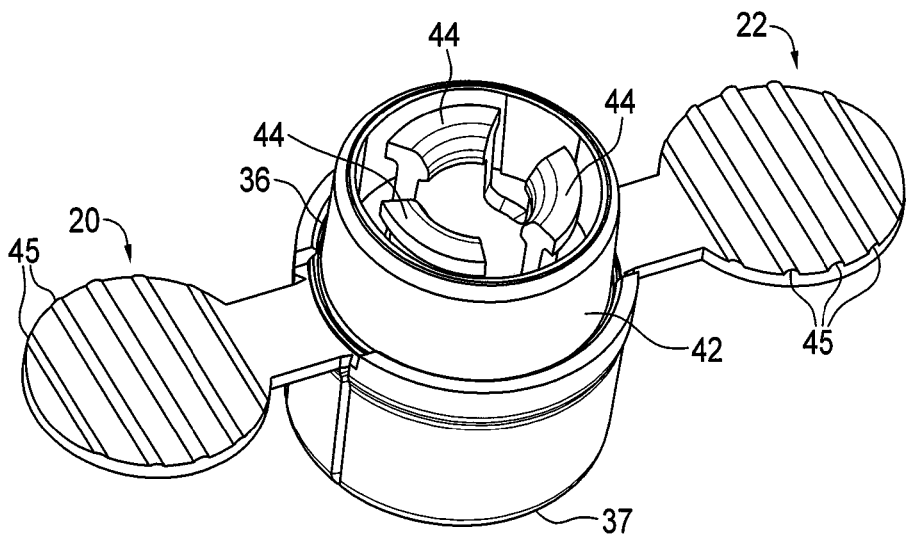
FIG. 5 is a perspective view of a casting fixture similar to FIGS. 2-4 with an applicator tip assembly received in position thereon.

FIG. 1 shows an example of an appliance part 10 which is fashioned using the casting article and the fabrication method disclosed herein. In this example, part 10 is an applicator tip assembly used in an appliance for applying skin formulations to the facial area of the skin. The applicator tip assembly 10 is described in more detail in co-pending application Ser. No. 12/474,426 assigned to the same assignee as the present invention. The information in that application is hereby incorporated by reference.

Briefly, the applicator tip assembly 10 includes a tip portion 12 which makes physical contact with the user in operation of the applicator. The tip portion 12 must be very soft and, in one example, is approximately Shore scale OO Durometer 30. The applicator tip assembly 10 also includes a base portion 14 which is sufficiently rigid to be conveniently installed and removed from a drive end portion of the applicator motor. As indicated above, there are difficulties using conventional casting fixtures to produce the described applicator tip assembly because of the very different characteristics of base portion 14 and tip portion 12. These difficulties include high fixture costs to obtain high volumes of production, difficulties in removing the cast parts from the fixture, and keeping the resulting parts clean until delivery to the end user.

The present casting fixture is shown in FIGS. 2-6. Casting fixture 16 is a single use fixture, made from lubricious material such as low-density polyethylene. Casting fixture 16 includes a central cup-like section 18 and two opposing side tear-off wing sections 20 and 22. The wing sections include tear-off lines 24 which extend down the side of the cup section 18. The tear-off lines 24 are thinner than the remainder of the fixture. The thinned sections are approximately 0.005 inches thick, while the remainder of the casting fixture 16 is typically approximately 0.030 inches thick, although this can vary. The size of the fixture can also vary depending upon the part to be cast. In the embodiment shown, the cup section 18 is approximately 0.300 inches high and 0.500 inches in diameter. The two wing sections 20 and 22 are approximately 0.600 inches long and extend directly outwardly from cup section 18. Each wing section includes a generally circular outer/outboard portion 28 and a narrower inner/inboard portion 30 which connects the outer portion to cup section 18. Each outer portion includes a small rim 32 along a portion of its periphery in order to facilitate tear-away of the wing sections. Top edge 34 of cup section 18 includes a lip 36 which extends around portions of the top edge 34 between the edges of inner portions 30 of the wing sections 20 and 22.

In the casting process, a rigid base portion 14 with an outer wall 42 is positioned in fixture 16 such that a small outwardly extending portion 39 of upper edge 40 (shown inverted in FIG. 6) of wall 42 can be snapped into lip 36 of cup section 18. This is shown most clearly in FIGS. 5 and 6, which also show ribs 45-45 on the upper surface of wing sections 20 and 22. This leaves an interior volume 37 within cup section 18 beneath base portion 14.

In this process, the bottom of base portion 14, which mates with a drive end of the applicator motor, as disclosed in detail in the '426 application, extends above the top of the casting fixture. Elements 44-44 of base portion 14 provide a capability of mating with the drive end of the applicator motor. Various arrangements to accomplish this result, however, are possible and are not a part of the present invention. Engagement member(s) 50, which in the embodiment shown could be a cylindrical member, or separate arcuate elements, extends downwardly into interior volume 37 of the cup section. The actual casting of the applicator assembly part now begins.

Figure 6:
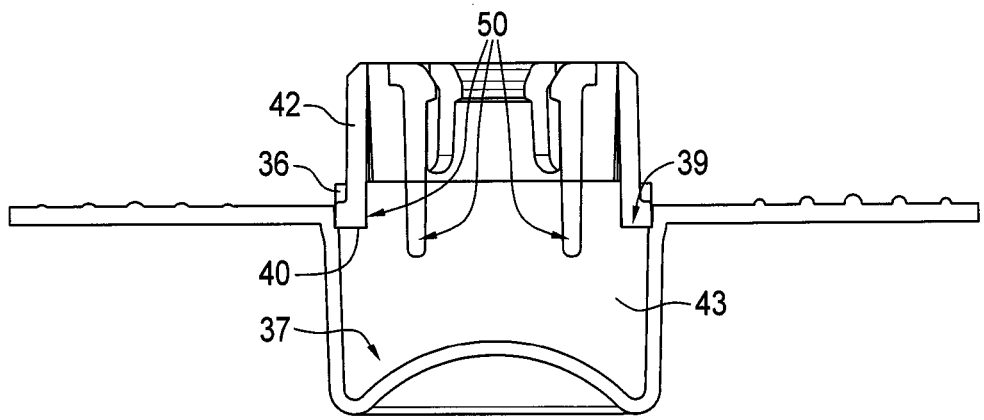
FIG. 6 is a cross-sectional view showing the casting fixture of FIG. 5, following filling of the casting fixture with silicone or similar material.

Silicone or other similar material 43, in liquid form, is poured through base portion 14 into the interior volume 37 of the cup section of the casting fixture. Sufficient material is provided to interior volume 37 that the material extends a small distance into the interior of base portion 14, as shown in FIG. 6. The engagement members 50-50 are partially encapsulated by the silicone material. This provides a reliable, strong connection between the silicone material, which defines the soft tip portion of the applicator assembly, and the more rigid base portion, with the rigid base portion providing the required reliable, strong attachment capability to a drive end of the applicator motor.

The casting fixture shown herein is single use, as indicated above. After the cup is filled with silicon, it is allowed to cure in the casting fixture and then stored. The casting fixture with the part therein can be shipped directly to consumers. When an applicator assembly is to be replaced, the user simply tears away the strips 20 and 22 from the new assembly and the cast silicone tip portion comes away easily and cleanly from the casting fixture. The applicator assembly is then installed onto the drive end of the applicator motor. The casting fixture is then disposed of.

The casting fixture disclosed above has several advantages, including its simplicity and low cost. The consumer can easily and readily remove the assembly from the fixture and install it. The part comes away cleanly from the fixture with the aid of the tear-away strips. The fixture arrangement also ensures that the part remains clean when it is provided to the user for replacement of existing parts.

Although a preferred embodiment has been disclosed for purposes of illustration, it should be understood that various changes and modifications and substitutions could be made in the preferred embodiment without departing from the spirit of the invention as defined by the claims which follow:

What is claimed is:

1. An article for casting parts comprising:
a single-use casting fixture which includes cup shaped casting section which includes a closed bottom portion, a side portion extending upwardly from the bottom portion, terminating in a rim portion, defining an open top area, the casting fixture further including tear-away sections on opposing sides of the casting section, wherein each of the tear-away sections having a portion which extends away from the casting section in the vicinity of the rim portion, and another portion which extends from the rim portion down the sides of the casting section, the rim portion adapted to receive a base portion an applicator tip assembly part, wherein the base portion includes engagement elements which extend away from the remainder of the base portion, the casting section having an interior volume beneath the rim portion adapted to receive flowable casting material, wherein the casting material adapted to extend a distance into interior of the base portion, and form an applicator tip portion of the applicator tip assembly part suitable for contact with facial skin areas of a user for application of skin formulations and when cured to solid form bonds to the engagement elements extending from the base portion, forming a firm engagement therewith, wherein the resulting combination of the casting fixture and the applicator tip assembly par can be stored until ready for use, and wherein the tear-away sections configured to permit convenient removal of the applicator tip assembly part from the casting fixture.

2. The article of claim 1, wherein the casting material is silicone.

3. The article of claim 1, wherein the tear-away sections include portions which extend outwardly from the casting section, permitting easy grasp thereof by a user.

4. The article of claim 1, wherein the casting fixture comprises a lubricious material to which the casting material will not adhere.

5. The article of claim 1, wherein a rim portion of the casting section includes a groove into which a peripheral edge of the base portion is snappable.

6. The article of claim 3, wherein the tear-away sections include ribs which extend around a portion of the peripheral edge of the tear-away sections and on an upper surface of the tear-away sections.

7. The article of claim 1, wherein the tear-away sections include tear-off lines which are thinner than the remainder of the casting fixture.

\* \* \* \* \*